United States Patent [19]
Abe

[11] Patent Number: 4,474,469
[45] Date of Patent: Oct. 2, 1984

[54] PRECISE POSITIONING OF OPTICAL FIBERS
[75] Inventor: Koichi Abe, Ottawa, Canada
[73] Assignee: Northern Telecom Limited, Montreal, Canada
[21] Appl. No.: 369,280
[22] Filed: Apr. 19, 1982
[51] Int. Cl.³ ............................ G02B 7/00; G02B 5/14
[52] U.S. Cl. .................................. 356/399; 356/73.1; 356/153; 350/96.21
[58] Field of Search ....................... 356/73.1, 153, 399, 356/400, 401; 350/96.2, 96.21

[56] References Cited
U.S. PATENT DOCUMENTS

| | | | |
|---|---|---|---|
| 3,355,979 | 12/1967 | Wirtanen | 356/399 |
| 3,667,848 | 6/1972 | Percival | 356/153 |
| 3,902,784 | 9/1975 | Dakss et al. | 350/96.21 |
| 3,999,841 | 12/1976 | Dakss et al. | 350/96.20 |
| 4,220,411 | 9/1980 | Cowen | 356/73.1 |

Primary Examiner—R. A. Rosenberger
Attorney, Agent, or Firm—Stuart L. Wilkinson

[57] ABSTRACT

Before splicing optical fibers having cladding and core of differing refractive index, the cores are axially aligned. The fiber ends are held apart with the fibers approximately coaxial. The fiber end surfaces are then illuminated and reflected light is monitored. Since reflectivity is a function of refractive index, the position of the core in the reflectivity profile of each surface can be readily identified. The fiber ends can then be manouvered transverse of the fiber axes to bring the fiber core centers into registration with a datum line. The fiber ends are then brought close together for splicing. Previously, fibers having nominally identical outside diameters were aligned simply by pressing them into a common V groove, the optical transmission efficiency then depending on fiber/core concentricity. Alternatively, light was injected into the far end of one fiber, monitored at the far end of the other fiber, and the fibers at their near end manipulated to maximize monitored optical power. The present invention provides an easier and cheaper method of ensuring core alignment especially for monomode fibers.

7 Claims, 8 Drawing Figures

REFRACTIVE INDEX

FIBRE CROSSECTION

PRECISE POSITIONING OF OPTICAL FIBERS

The invention relates to a method and apparatus for accurately positioning the end of an optical fiber to maximize optical power transferred between the fiber and another fiber or between the fiber and a fiberoptic device.

The invention can be used before fiber splicing, connecting, bonding, or anchoring operations.

Before splicing or connecting a pair of optical fibers for use in telecommunications, the adjacent fiber ends are fixed in positions ensuring maximum optical power transfer between them. Typically, an optical fiber used in telecommunications has a central core and an outer cladding, the core having a refractive index which is higher than that of the cladding and which increases towards the core axis. Optical power transfer is maximized if the fiber cores are axially aligned.

In a known method of aligning two fibers having nominally identical refractive index profile and outer diameter, the fiber ends are positioned close together and are pressed into a common V groove to automatically align part at least of the fiber outer surfaces. However, the cores are aligned only if the core and cladding of each fiber are accurately concentric and that can be achieved only through tight manufacturing tolerances with attendant cost.

Another known method for core alignment is to inject light at the far end of one fiber and monitor optical power received at the far end of the other fiber. The near ends of the fibers are manouvered and fixed in the relative disposition in which maximum optical power is monitored. The need for an optical source at the far end of one fiber and an optical detector at the far end of the other fiber is inconvenient in the field because of distance and equally inconvenient in factory splicing during fiber and cable manufacture where fiber is wound on storage reels.

I now propose an improved method and apparatus for accurately positioning an optical fiber end.

According to one aspect of the invention, there is provided a method of positioning one end of an optical fiber relative to a datum line, the fiber having an end surface of known reflectivity profile, the method comprising directing light at the fiber end surface, monitoring light reflected from the end surface to identify the position of the reflectivity profile, and moving the fiber end in a plane perpendicular to the longitudinal axis of the fiber to a position at which the reflectivity profile has a predetermined disposition relative to the datum line.

The method can be used for coaxially aligning a pair of fibers. The end of one optical fiber is first positioned using the method previously defined so that the fiber extends along the datum line in one direction and the method is subsequently used to locate a second fiber end surface on the datum line so that the second fiber extends along the datum line in the opposite direction.

Typically, optical fiber used in telecommunications has a refractive index which varies radially from the fiber axis to its outer surface. The refractive index variation is characterized by sharp discontinuities and, since material reflectivity is proportional to material refractive index, there are corresponding reflectivity discontinuities apparent on the end surface of a fiber. Typically, fiber has an outer cladding of lower refractive index than a central core. Maximum optical power transfer between the fibers can be achieved by using the method defined to axially align adjacent fiber cores.

The method can alternatively be used to align a fiber with a specific region of an active surface of a fiberoptic device if that specific region has a visually identifiable feature which can be brought into registration with the datum line.

The invention also provides apparatus for positioning one end of an optical fiber relative to a datum line, the fiber having an end surface of known reflectivity profile, the apparatus comprising directing means for directing light at the fiber end surface, monitoring means for monitoring light reflected from the end surface to identify the position of the reflectivity profile, and adjustment means for moving the fiber end in a plane perpendicular to a longitudinal axis of the fiber to a position at which the reflectivity profile has a predetermined disposition relative to the datum line.

Preferably the directing means comprises a light source located off the axis of the fiber and a mirror device to direct light from the source generally perpendicular to the fiber end surface.

Particularly for coaxially aligning a pair of fibers, the apparatus can further comprise means for mounting the mirror device between the opposed end surfaces of the fibers. The mirror device can be a pair of prisms located side-by-side, the device being drivable between two positions, in a first of which, a surface of one prism directs light at the end surface of one fiber and, in a second of which, a surface of the other prism directs light into the end surface of the other fiber. The mirror device can alternatively be a sinqle mirror mounted on a carriage whereby in a first position the mirror reflects light from an off-axis source into the end surface of one fiber and, with the carriage rotated through 180°, the mirror directs light from the source into the end surface of the other fiber. The apparatus can further include two blocks, each block having V groove formations in a surface thereof, the V grooves being approximately aligned. One or both of the blocks can be attached to a jig having X, Y and Z microscrew adjusters whereby the fiber ends can be relatively moved to alter the spacing of the fiber end surfaces and to alter the relative disposition of the fiber ends in a plane perpendicular to their axes. Preferably the monitoring means includes a microscope objective and eye-piece lenses. A beam splitter can be mounted on the microscope optic axis to direct light from the source through the objective lens to the mirror device.

Embodiments of the invention will now be described, by way of example, reference to the accompanying drawings in which.

Figure 1:
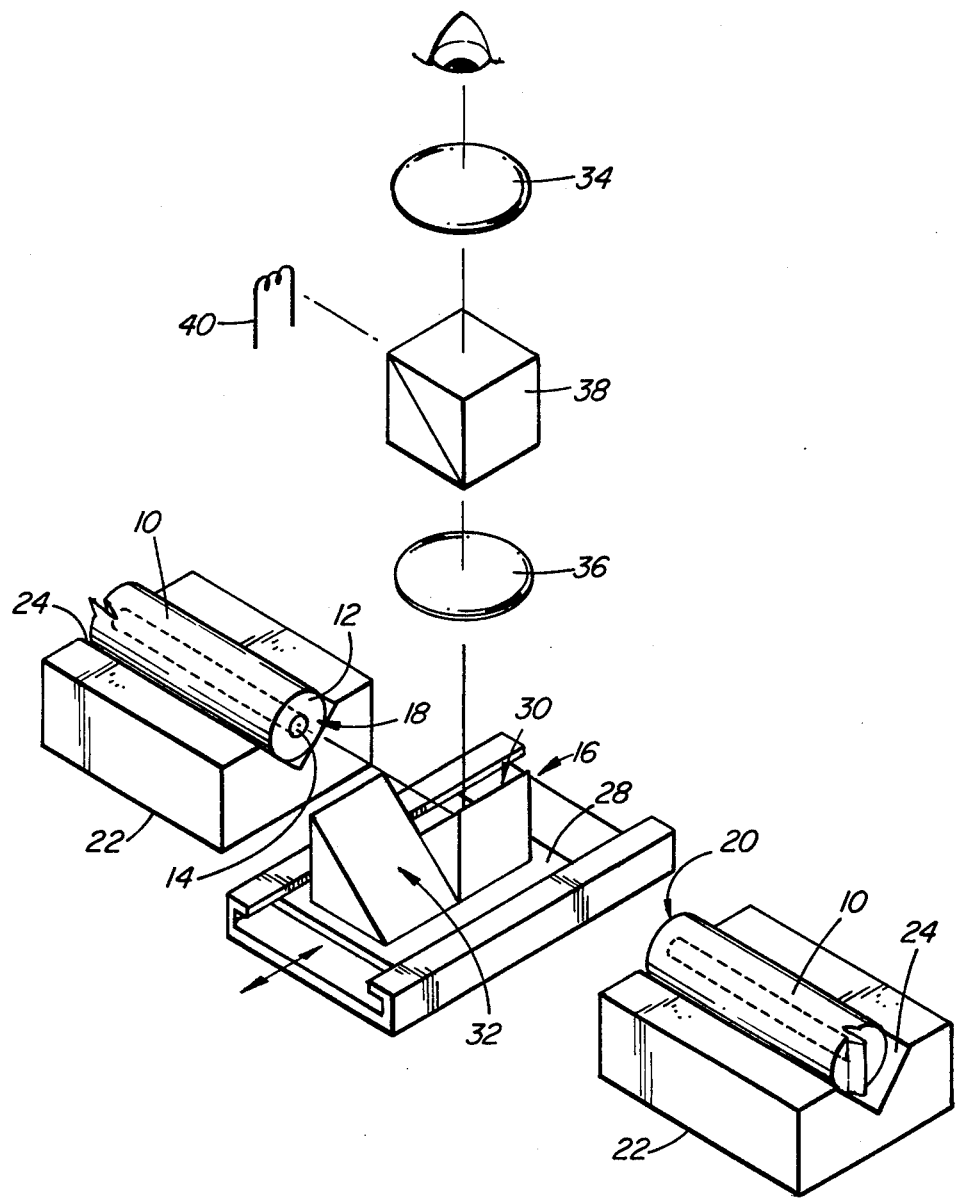
FIG. 1 shows a schematic diagram of optical fiber alignment apparatus according to the invention.

Referring in detail to FIG. 1, there are shown two optical fibers 10, each fiber consisting of an outer cladding 12 of pure fused silica and a core 14 of doped fused silica, the dopant level varying radially to give a desired refractive index profile.

Figure 2:
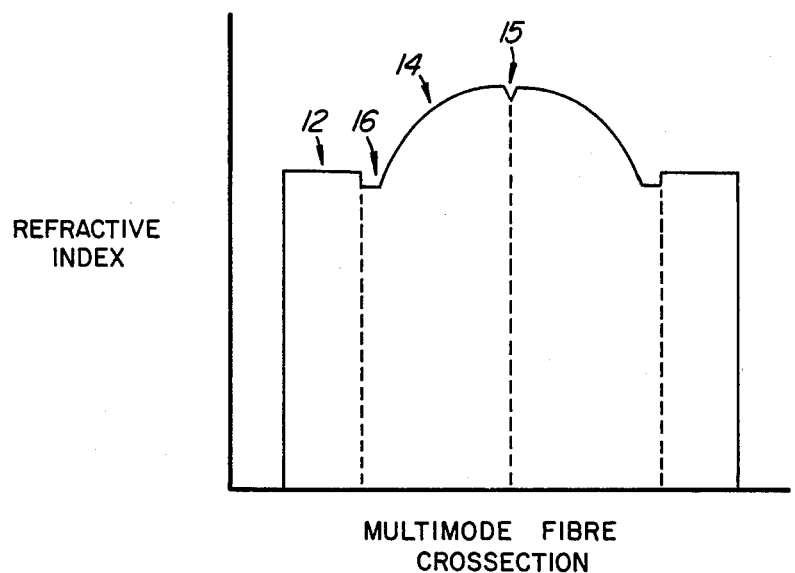
FIG. 2 shows a refractive index orofile of a multimode graded index fiber.

Typically, a multimode fiber has an outer diameter of 125 microns and a core diameter of 50 microns, the refractive index profile being as shown in FIG. 2. The cladding 12 is of uniform refractive index and is separated from the core 14 by a thin barrier layer 16 of silica doped with fluorine or boron to lower the refractive index. The barrier layer is present to prevent impurity diffusion from the cladding to the core and also to make core deposition easier during manufacture. The core 14 is doped with germanium, the dopant level and thus the refractive index having an approximately parabolic profile across the core. The fiber represented in FIG. 2 is produced by the well-known method of internally depositing doped material on the inside wall of a fused silica tube and then collapsing the tube. The FIG. 2 profile, at the core axis, has a small but distinct reduction 15 in refractive index caused by loss of dopant at the tube internal surface during manufacture.

Typically, a monomode fiber has an outer diameter of 125 microns and a core diameter less than 10 microns. The refractive index profile, as shown in the FIG. 4 examples, has a distinct step 17 where the core ends and the cladding begins.

In both multimode and monomode fibers, there are therefore distinct refractive index discontinuities which can be related to the position of the core within the fibers.

The reflectivity of a material is a function of refractive index. Consequently, if a fiber end surface which has been cleaved nearly mirror flat is illuminated under a microscope and reflected light is viewed, reflectivity discontinuities are clearly visible. The reflectivity R of the fiber end surface is given by the Fresnel equation:

$$R = \left(\frac{n(r) - 1}{n(r) + 1}\right)^2$$

where $n(r)$ is the refractive index of the fiber as a function of the distance from the core center.

A refractive index profile for multimode graded index fiber is shown in FIG. 2, the reflectivity profile being of a corresponding form since a 1% change in refractive index gives approximately a 5% change in reflected light intensity. Simply by visual observation, an abrupt change of the refractive index as small as 0.1% can quite easily be seen.

The reflectivity discontinuities can be used to accurately align fiber cores, this being the condition for maximum power transfer between a pair of fibers. As indicated previously, core alignment is especially important for monomode fiber where the core is less than 10 microns across compared to the full fiber diameter of 125 microns. Clearly, any concentricity error in core location will produce a very inefficient splice if the fibers are aligned merely by bringing their outer surfaces into registration.

Referring back to FIG. 1, the ends of the two fibers 10 are supported on a jig with end surfaces 18 and 20 spaced typically 5mm apart and with the fiber central axes approximately aligned. The jig is not shown in detail but is of a type used for fiber splicing purposes and is well-known in the art. It has independently movable heads 22 which can be driven by microscrew drives to change the separation of the heads, (Z axis drive), and to produce relative movement of the heads in the XY plane. In an upper surface of each head is a V groove 24 into which respective fibers 10 are pressed so that the fiber ends extend just beyond the ends of the grooves.

Between the two fiber end surfaces 18 and 20 is mounted a mirror device 16 consisting of two small prisms mounted side-by-side. The mirror device is supported on a carriage 28 which is mounted on a part of the jig which can be driven by the aid of a further microscrew device to enter the gap between the two fibers 10. The device can be moved between a first position in which a surface 30 of one prism lies on and extends at 45° to the fiber axes and a second position in which a surface 32 of the other prism lies on and extends at 45° to the fiber axes. In both of these positions, the relevant surface 30 or 32 also lies on and extends at 45° to the optic axis of a microscope having an eye-piece lens 34 and objective lens 36. Positioned on the optic axis is a beam splitter 38 which directs light from a source 40 through the objective lens 36 to be reflected from one or other of the surfaces 30 and 32 to the respective fiber end surface 18 or 20. Light is subsequently reflected from the fiber end surface 18 or 20 back through the objective lens 36 and the beam splitter 38 to the eye-piece 34. Typically, the microscope has a cross-hairs centered on the optic axis.

In operation, the mirror device is moved first to a position in which end surface 18 is illuminated. The end surface is brought into focus by adjusting the Z axis microscrew. On viewing the end surface 18, the cross-hairs center and the reflectivity dip which, as explained previously, marks the position of the core axis will not normally coincide. The XY microscrews are then adjusted to move the left-hand V groove and the fiber end surface 18 in an XY plane perpendicular to the fiber axis. Once coincidence between the cross-hairs and the reflectivity dip is achieved, the mirror device is driven to its second position and coincidence of the cross-hair center and the core center reflectivity dip of the other fiber is achieved by a similar adjustment. Because the mirror surfaces are accurately inclined at 45° to both the fiber axes and the microscope optic axis, this dual adjustment automatically aligns the fiber cores. Finally, the mirror device 16 is withdrawn from between the fiber end surfaces 18 and 20 and the Z axis microscrew is adjusted to bring the fiber ends sufficiently close for splicing.

As is well known in the art, the Z axis microscrew is, in fact, moved during a subsequent splicing operation in order to avoid necking of the fiber at the splice zone. The X and Y microscrews are maintained in place until splicing is complete. As mentioned, the fibers 20 before splicing, project just beyond the end surfaces of heads 22 and are separated by a few microns. The separation of the heads 22 permits electrodes of an arc fusion device to be positioned close to the fiber ends when splicing the two fibers.

Figure 3:
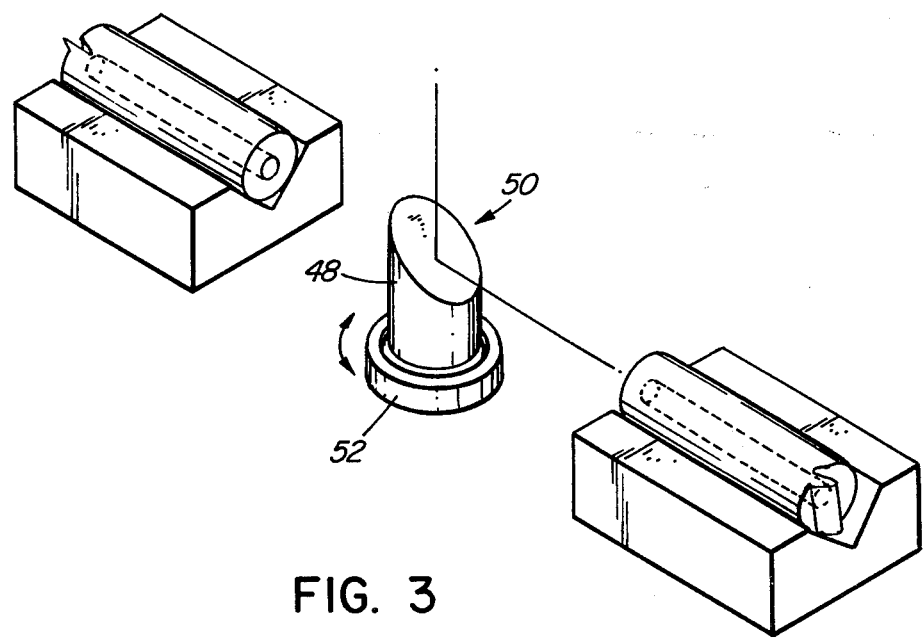
FIG. 3 shows an alternative form of mirror device for use in the method of the invention.

An alternative mirror device to the double prism 16 is shown in FIG. 3. The device consists of a steel rod 48 of 3 mm diameter having a highly polished end surface 50 inclined at 45° to the rod axis. The base of the rod is mounted within a rotatable carriage shown schematically as 52. The carriage can be driven through exactly 180° using a microscrew device (not shown). In use, the rod 48 is mounted below a microscope with the rod axis coaxial with the microscope optical axis and the mirror surface inclined at 45° both to the optical axis and to the axes of the two fibers which are to be joined. As in the previous embodiment, the end surface of one fiber is viewed and adjustment of the fiber end made to bring the low reflectivity core center into registration with a datum line corresponding to the microscope cross-hairs. The rod is then turned through exactly 180° and the procedure is repeated. Once both core centers are in registration with the datum line, then they must automatically be axially aligned.

Figure 4A:
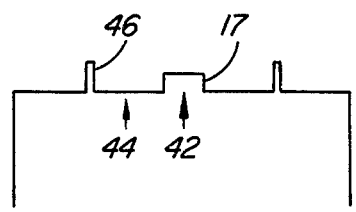
FIGS. 4a to 4e show examples of monomode fiber index profile specifically tailored for use of the fiber alignment method described.
Figure 4B:
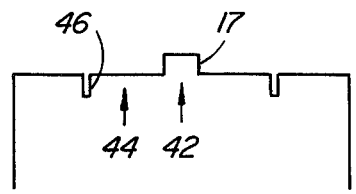
Figure 4C:
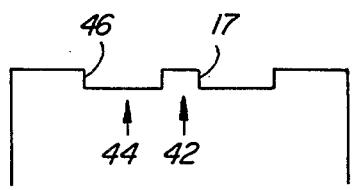
Figure 4D:
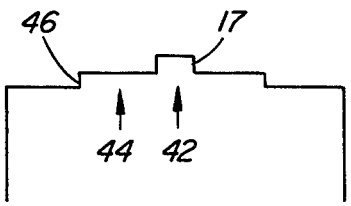
Figure 4E:
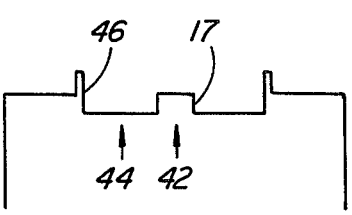

As indicated previously, monomode fibers for which accurate core alignment is most critical, have a core diameter less than 10 microns and a cladding of 125 microns. The relatively higher reflectivity core is, therefore, a very small feature within the end surface of the fiber. To facilitate fiber core alignment using the method described, an additional refractive index discontinuity can be introduced into the fiber during manufacture. The refractive index profile of each of the FIGS. 4a to 4e are taken along a diameter of a monomode fiber which is symmetrical about a longitudinal axis. The monomode fibers have a core 42 and an intermediate cladding layer 44, the refractive indexes and dimensions of which are chosen to ensure monomode transmission through the fiber. Radially outside the cladding 44 is a refractive index discontinuity 46 which may be embodied as a small annular ring of relatively high index (FIG. 4a), or relatively low index (FIG. 4b). Alternatively, it may be embodied as a step up, (FIG. 4c), or a step down (FIG. 4d), in refractive index. Finally, it may utilize both features as shown in the FIG. 4e profile. In the well-known vapour deposition method for fiber production, silica, containing a certain dopant to change its refractive index, is deposited on the inside surface of a fused silica tube. Subsequently, the tube is heated and collapsed into a rod from which fiber is pulled. The FIG. 4 profiles can be obtained by suitably doping silica with germanium to raise the refractive index or fluorine to lower it, and continuing the deposition cycle sufficiently long to obtain the layer thickness desired.

In the embodiments described, the illumination and observation directions are both at 90° to the fiber end surface, the incident and reflected light thus travelling along the microscope optical axis. Although this angle is preferred since it offers spatial economy, it is not critical.

The embodiments described all show the use of the method in aligning two fibers for splicing or connecting. Clearly, the method can be used to permanently bond a fiber end relative to a light source or photodetector, if it is important to align the fiber core with a particular visually distinctive position on the active surface of the fiberoptic device.

What is claimed is:

1. A method of aligning two optical fibers prior to splicing thereof, the method comprising positioning an end portion of one fiber within a first fixed jig so that an end surface of the fiber faces in a first direction, positioning an end portion of the second fiber within a second jig so that an end surface of the second fiber faces in a direction opposite to the first direction, the second jig moveable in x, y and z directions wherein the z direction is substantially aligned with said first direction, inspecting the end surface of the first fiber using a microscope having an optic axis extending generally perpendicular to the z direction and a reflector device located at the intersection of the z direction and the optic axis for directing light reflected from the first fiber end surface along said optic axis, establishing a datum line relative to a first reflective discontinuity on the fiber end durface at a position of marked change in refractive index within the fiber, inspecting the end of the second fiber using the microscope and said reflector device after adjusting the reflector device to direct light reflected from the second fiber end surface along said optic axis, identifying a second reflective discontinuity on the second fiber end surface corresponding to said first reflective discontinuity, adjusting the second jig so as to align the second reflective discontinuity with said datum lime, removing said reflector device, and moving the second jig so as to direct the fiber end surfaces towards one another.

2. A method as claimed in claim 1 in which the reflective discontinuity corresponds to a point at the interface of a core region and a cladding region of the fiber.

3. A method as claimed in claim 2 in which the reflective discontinuity used is a low reflectivity dip in a high reflectivity core in each of the fibers.

4. Apparatus for use in aligning two optical fibers prior to splicing thereof, the apparatus comprising a first fixed jig for positioning therein an end portion of a first fiber, a second jig for positioning therein the end portion of a second fiber, the second jig moveable in x, y and x directions wherein the jigs are operable to align the fiber end portions with the z direction, means for inspecting the end surfaces of fibers positioned within the jigs, the inspection means comprising a microscope having an optic axis extending generally perpendicular to the z direction and reflector device located at the intersection of the z direction and the optic axis, the reflector device moveable between positions in which it directs an image of the end surface of the first fiber along the optic axis to a position in which it directs an image of the end surface of the second fiber along the optic axis, the reflector device further being moveable away from the jigs to permit the moveable jig to be moved towards the fixed jig to bring the fiber end surfaces together.

5. Apparatus as claimed in claim 4, in which the reflector device comprises a pair of prisms located side-by-side, the device being driveable between two positions, in a first of which, a surface of one prism directs light from a source into the end surface of one fiber and, in a second position, a surface of the other prism directs light from the source into the end surface of the other fiber.

6. Apparatus according to claim 4, in which the reflector device is a plane mirror mounted on a rotatable carriage angularly moveable between a first position in which the mirror reflects light from a source into the end surface of one fiber and a second position in which the mirror reflects light from the source into the end surface of the other fiber.

7. Apparatus as claimed in claim 4, in which the jigs each have a V-groove in a top surface thereof, the V-grooves being approximately aligned.

* * * * *